Patented Sept. 8, 1936

2,053,424

UNITED STATES PATENT OFFICE 2,053,424

MANUFACTURE OF ALKYL SULPHONIC ACIDS

Alfred Davidson, Blackley, Manchester, England, assignor to Imperial Chemical Industries Limited, a corporation of Great Britain No Drawing. Application February 11, 1935, Serial No. 6,102. In Great Britain February 13, 1934

11 Claims. (Cl. 260—159)

This invention relates to a process for making true sulphonic acid derivatives of hydrocarbons and more particularly to a process for making alkyl sulphonic acids from alcohols containing at least eight carbon atoms.

It is an object of this invention to make true sulphonic acid derivatives of hydrocarbons by a process which is more efficient and more economical than any heretofore employed. A further object is to produce alkyl sulphonic acids from alcohols containing at least eight carbon atoms. A still further object is to produce true sulphonic acid derivatives of normal primary alcohols containing from ten to eighteen carbon atoms by a process which results in almost theoretical yields. Additional objects will become apparent from a consideration of the following specification and claims.

These objects are attained according to the herein described invention whereby inorganic esters of higher alcohols are treated with water-soluble sulphites in the presence of an organic base and a phosphate and/or the reaction products of an organic base and a phosphate. In a more limited sense these objects may be attained by treating an inorganic ester of a higher alcohol having at least eight carbon atoms with an aqueous solution of a water-soluble sulphite in the presence of an aromatic base and a water-soluble phosphate and/or the reaction products of said aromatic base and phosphate. In a still more limited sense these objects may be attained by treating chloride, bromide or sulphate esters of higher fatty alcohols having from ten to eighteen carbon atoms with an aqueous solution of a water-soluble sulphite in the presence of an aromatic amine and a water-soluble phosphate and/or the reaction products of said amine and phosphate. The preferred embodiment of this invention comprises a process whereby chloride, bromide or sulphate esters of normal primary alcohols containing from ten to eighteen carbon atoms are converted into their corresponding sulphonic acids by treatment with a hot aqueous solution of sodium sulphite in the presence of dianilido phosphoric acid.

The invention may be more readily understood by a consideration of the following illustrative examples:

Example 1

A mixture of 110 parts of cetyl bromide, 263 parts of sodium sulphite crystals, 263 parts of water and 1 part of dianilido phosphoric acid, is heated in an iron autoclave with stirring at 130° C. for 18 hours. The thick paste obtained on cooling is filtered. The solid is washed if necessary with an organic solvent, e. g., with acetone to remove any unchanged cetyl bromide and is dried.

Example 2

A mixture of 234 parts of a 15% aqueous paste of cetyl sulphuric ester sodium salt, 38 parts of sodium sulphite crystals, 38 parts of water and 0.34 part of dianilido phosphoric acid is heated with stirring in an autoclave at 130–140° C. for 18 hours. After cooling, the residue is filtered, washed with 12% brine and dried. The yield is almost that calculated by theory. After recrystallizing the product from methyl alcohol 30 parts of pure sodium cetyl sulphonate are obtained.

Example 3

A mixture of 83 parts of dodecyl bromide, 263 parts of sodium sulphite crystals, 263 parts of water, 1 part of aniline and 1 part of sodium phosphate is heated with stirring in an autoclave for 16 hours at 130–140° C. The reaction mixture is diluted with an equal volume of water, cooled and the sodium dodecyl sulphonate filtered off. After crystallizing from methyl alcohol, 65 parts of sodium dodecyl sulphonate are obtained.

Example 4

A mixture of 120 parts of a 30% aqueous paste of dodecyl sodium sulphate, 125 parts of sodium sulphite crystals, 125 parts of water, 1 part of aniline and 1 part of sodium phosphate is heated with stirring in an autoclave for 24 hours, at 140–150° C. The reaction product is treated as described in Example 3. The yield of recrystallized dodecyl sodium sulphonate is 32 parts.

It is understood that the aforementioned examples are merely illustrative and are not intended to be restrictive in any way upon the scope of the present invention. Numerous other alkyl inorganic esters may be substituted and/or used in admixture with the inorganic ester of cetyl alcohol. Moreover, other anilido phosphates or compounds which react to produce such phosphates may be substituted for the dianilido phosphoric acid used in the examples.

Sulphonic acids contemplated herein are advisably produced from alcohols containing at least eight carbon atoms. Such alcohols may be of the aliphatic, naphthenic, alicyclic and/or aralkyl series. Furthermore, these alcohols may be either saturated or unsaturated, and may contain more than one hydroxyl group. In addition to the aforementioned modifications it is to be understood that the alcohol or alcohols selected may be further substituted. A few representative examples of alcohols coming within the contemplated field are benzyl alcohol, alcohols obtained from hydrogenated benzene compounds, alcohols such as methyl hexalin obtained from hydrogenated hydroxylated aromatic compounds, fatty alcohols obtained by the reduction of fats, oils and waxes of animal or vegetable origin, alcohols containing halogen atoms and related substituents, alcohols having benzene and other cyclic groups substituted thereon such as by condensation of an unsaturated fatty alcohol with benzene, etc.

For optimum results it is in general advisable to select one or more normal primary alcohols containing at least eight and preferably from ten to eighteen carbon atoms. These alcohols are, for example, octyl, decyl, lauryl, myristyl, cetyl, stearyl, oleyl, linoleyl, and ricinoleyl alcohols. The preceding alcohols may be used alone and/or in admixture with one another and/or in admixture with one or more of the numerous additional alcohols contemplated herein and previously described.

Inorganic esters of the previously mentioned and related alcohols may be obtained by customary esterification reactions with inorganic acids. The preferred acids are, in general, hydrochloric, hydrobromic, chlorsulphonic and concentrated sulphuric acids. Esters which are preferred for general use are the chlorides, bromides and sulphates of the normal primary alcohols specifically referred to herein.

Ordinarily any water-soluble sulphite or mixture of sulphites may be selected. However, alkali metal sulphites, and in particular sodium sulphite, are preferred.

The aforementioned alcohols and sulphites are reacted in the presence of an organic base and a phosphate and/or the reaction products of said base and phosphate. This reaction is preferably carried out in a hot aqueous medium maintained, for example, at a temperature within the range of 120–150° C. Organic bases which are of especial value are the amines, and particularly amines of the benzene series which may be unsubstituted or further substituted with substituents such as the alkyl, alkoxy, etc. groups. The phosphate selected is advisably soluble in water, for example alkali metal phosphates such as sodium phosphate. As previously mentioned, in place of or in addition to the aforementioned phosphates and amines the reaction products thereof may be utilized. Such products may be produced, for instance, by mixing equivalent proportions of aniline or a related amine with sodium phosphate in accordance with the procedure well known to one familiar with the art. In this connection it may here be mentioned that dianilido phosphoric acid gives exceptionally satisfactory results under a wide variety of conditions, and is, therefore, understood to be preferred herein.

By means of this invention true sulphonic acid derivatives of higher alcohols are obtained in a yield which closely approximates the theoretical. Inefficient prior art processes may, therefore, be greatly improved in accordance with the teachings of this invention. Furthermore, the resulting compounds are quite stable under a wide variety of conditions and are of particular value for use as wetting, detergent, dispersing and emulsifying agents. In the form of their salts, produced from well known salt-forming compounds of either organic or inorganic origin, they may be used in place of or in admixture with soap and/or soap-like products in the multitudinous processes where such products have been previously used or are capable of use.

This process possesses the further advantage that it may be carried out under atmospheric or superatmospheric pressure. Likewise, the presence of superficially active catalysts such as carbon and diatomaceous earth and/or buffers such as boric acid, ammonium carbonate, trisodium phosphate, etc. is optional.

As many apparently widely different embodiments of this invention may be made without departing from the spirit and scope thereof, it is to be understood that the invention is not limited to the specific embodiments thereof except as defined in the appended claims.

I claim:

1. A process for producing sulphonic acid derivatives of higher alcohols which comprises treating an inorganic acid ester of said alcohols with a water soluble sulphite in the presence of an organic base and a phosphate.

2. A process for producing sulphonic acid derivatives of higher alcohols which comprises treating an inorganic acid ester of said alcohols with a water-soluble sulphite in the presence of an aromatic base and phosphate.

3. A process for producing sulphonic acid derivatives of higher alcohols containing at least eight carbon atoms which comprises treating an inorganic acid ester of said alcohols with a salt of sulphurous acid and an inorganic alkaline base in the presence of an amine and a phosphate.

4. A process for producing sulphonic acid derivatives of higher alcohols containing at least eight carbon atoms which comprises treating an inorganic acid ester of said alcohols with a salt of sulphurous acid and an inorganic alkaline base in the presence of an aromatic amine and a phosphate.

5. A process for producing sulphonic acid derivatives of alcohols containing from eight to eighteen carbon atoms which comprises treating an inorganic acid ester of said alcohols with a salt of sulphurous acid and an inorganic alkaline base in the presence of an amino-benzene and a water-soluble phosphate.

6. A process for producing sulphonic acid derivatives of alcohols containing from eight to eighteen carbon atoms which comprises treating an inorganic acid ester of said alcohols with a salt of sulphurous acid and an inorganic base in the presence of an anilido phosphoric acid.

7. A process for producing sulphonic acid derivatives of normal primary alcohols containing from ten to eighteen carbon atoms which comprises treating a member selected from the group consisting of chloride, bromide and sulphate esters of said alcohols with a salt of sulphurous acid and an inorganic alkaline base in the presence of an anilido phosphoric acid.

8. A process for producing sulphonic acid derivatives of higher alcohols which comprises treating a solution of an inorganic acid ester of a normal primary alcohol containing from eight to eighteen carbon atoms with a salt of sulphurous acid and an inorganic alkaline base in the presence of an amino benzene and a water soluble phosphate at elevated temperatures and pressures.

9. A process for producing sulphonic acid derivatives of higher alcohols which comprises treating a solution of an inorganic acid ester of a normal primary alcohol containing from eight to eighteen carbon atoms with sodium sulphite in the presence of an amino benzene and a water soluble phosphate at elevated temperatures and pressures.

10. A process for producing sulphonic acid derivatives of higher alcohols which comprises treating a solution of an inorganic acid ester of a normal primary alcohol containing from eight to eighteen carbon atoms with sodium sulphite in the presence of aniline and a water soluble phosphate at elevated temperatures and pressures.

11. A process for producing cetyl sulphonic acid which comprises treating cetyl bromide with a hot aqueous solution of sodium sulphite in the presence of dianilido phosphoric acid.

ALFRED DAVIDSON.

CERTIFICATE OF CORRECTION.

Patent No. 2,053,424.　　　　　　　　　　　　　　　　September 8, 1936.

ALFRED DAVIDSON.

It is hereby certified that error appears in the printed specification of the above numbered patent requiring correction as follows: Page 2, second column, line 55, claim 6, after "inorganic" insert alkaline; and that the said Letters Patent should be read with this correction therein that the same may conform to the record of the case in the Patent Office.

Signed and sealed this 8th day of December, A. D. 1936.

Henry Van Arsdale (Seal)　　　　　　　　　　　　　　　　Acting Commissioner of Patents.